US006919561B2

United States Patent
Lee et al.

(10) Patent No.: US 6,919,561 B2
(45) Date of Patent: Jul. 19, 2005

(54) DIFFRACTION LASER ENCODER APPARATUS

(75) Inventors: Chih-Kung Lee, 6Fl., No. 3, Lane 165, Duenhua N. Rd., Taipei (TW); Liang-Bin Yu, Shinjuang (TW); Chyan-Chyi Wu, Taipei (TW); Shu-Sheng Lee, Taipei (TW); Wen-Jong Wu, Junghe (TW); Ming-Hua Wen, Taipei (TW); Shih-Jui Chen, Taipei (TW); Giin-Yuan Wu, Taipei (TW)

(73) Assignee: Chih-Kung Lee, Taipei (TW)

(*) Notice: Subject to any disclaimer, the term of this patent is extended or adjusted under 35 U.S.C. 154(b) by 0 days.

(21) Appl. No.: 10/775,857

(22) Filed: Feb. 9, 2004

(65) Prior Publication Data

US 2004/0155179 A1 Aug. 12, 2004

Related U.S. Application Data

(63) Continuation-in-part of application No. 09/997,351, filed on Nov. 27, 2001, now abandoned.

(51) Int. Cl.[7] .......................... H01J 3/14; H01J 40/14; H01J 5/16
(52) U.S. Cl. ........................... 250/237 G; 356/488
(58) Field of Search .................... 250/237 G, 237 R, 250/216, 213.18, 231.13, 559.29; 356/488, 487, 486, 614, 616, 622; 359/437, 488, 495; 341/6, 11, 13

(56) References Cited

U.S. PATENT DOCUMENTS

| 5,436,724 | A | * | 7/1995 | Ishizuka et al. | 356/488 |
| 5,444,532 | A | * | 8/1995 | Sueyoshi | 356/487 |
| 5,825,023 | A | * | 10/1998 | Cai et al. | 250/237 G |
| 5,909,333 | A | * | 6/1999 | Best et al. | 250/237 G |

* cited by examiner

Primary Examiner—Thanh X. Luu
Assistant Examiner—Seung C. Sohn
(74) Attorney, Agent, or Firm—J.C. Patents

(57) ABSTRACT

A diffraction laser encoder apparatus for positional and movement information measurement of a target made with a diffraction grating. The diffraction laser encoder has a laser light source for generating a source beam. A polarization beam splitter assembly comprises a polarization beam splitter for receiving the source beam for splitting a P-polarization component and an S-polarization component of the source beam into parallel and offset beams. A focusing lens focuses the P-polarization component and the S-polarization component beams onto the target diffraction grating and returning diffracted P-polarization and diffracted S-polarization beams back into the polarization beam splitter for generating a detector beam coaxially containing the diffracted P-polarization and the diffracted S-polarization beams. A detector assembly receives the detector beam for electrical processing and analysis for resolving the positional and movement information. In the process, phase information contained in the diffraction signal returned by the target is analyzed.

4 Claims, 2 Drawing Sheets

DIFFRACTION LASER ENCODER APPARATUS

CROSS REFERENCE

The present application is a continuation-in-part of a prior application Ser. No. 09/997,351 filed Nov. 27, 2001 now abandoned, entitled "Diffraction laser optical scale having high tolerance to the phase difference and alignment error of the grating optical scale".

BACKGROUND OF THE INVENTION

1. Field of the Invention

The present invention relates in general to optical encoders. In particular, the present invention relates a diffraction laser encoder with improved target alignment tolerance.

2. Description of the Related Art

Geometrical optics encoders and diffraction encoders are commonly used for positional and other measurement applications. Both encoders are based on similar principle of operation. Light signal is modulated due to the movement of a grating, and information regarding positional shift and the moving velocity of the grating is obtained via analysis on the received modulated signal. Primary differences between the two are in the method of light modulation and the analytical procedures of the collected light signal.

In a geometrical optics encoder system, grating pitch is typically at the order of about 10 micrometers, which is about 10 times the wavelength of visible laser light sources. Resolution of a geometrical optics encoder system is directly related to the grating pitch, which has a practical limitation. Diffraction phenomenon itself deteriorates signal-to-noise ratio of the system to a level insufficient for practical application. The only way to achieve finer resolution is the refinement of electronics, which is also the major issue in these geometrical optics encoder systems.

In a diffraction encoder system, on the other hand, diffraction grating is typically made at a level of a micrometer, about one-tenth of a typical geometrical optics encoder. In a diffraction encoder system, grating pitch can be reduced for increased resolution as long as operating beams with comparable wavelength is available. Measurement resolution can be improved both electronically and optically (geometrically in a diffraction encoder system. Conventional diffraction encoders, however, are bulky due to their optical component assembly in the system configuration setup. Complex beam path arrangements prevent their application in miniature systems. Miniaturization of these conventional encoder systems sacrifices measurement resolution.

SUMMARY OF THE INVENTION

The present invention provides a diffraction laser encoder apparatus for positional and movement information measurement of a target made with a diffraction grating. The diffraction laser encoder has a laser light source for generating a source beam. A polarization beam splitter assembly comprises a polarization beam splitter for receiving the source beam for splitting a P-polarization component and an S-polarization component of the source beam into parallel and offset beams. A focusing lens focuses the P-polarization component and the S-polarization component beams onto the target diffraction grating and returning diffracted P-polarization and diffracted S-polarization beams back into the polarization beam splitter for generating a detector beam coaxially containing the diffracted P-polarization and the diffracted S-polarization beams. A detector assembly receives the detector beam for electrical processing and analysis for resolving the positional and movement information. In the process, phase information contained in the diffraction signal returned by the target is analyzed.

DETAILED DESCRIPTION OF THE PREFERRED EMBODIMENTS

Figure 1:
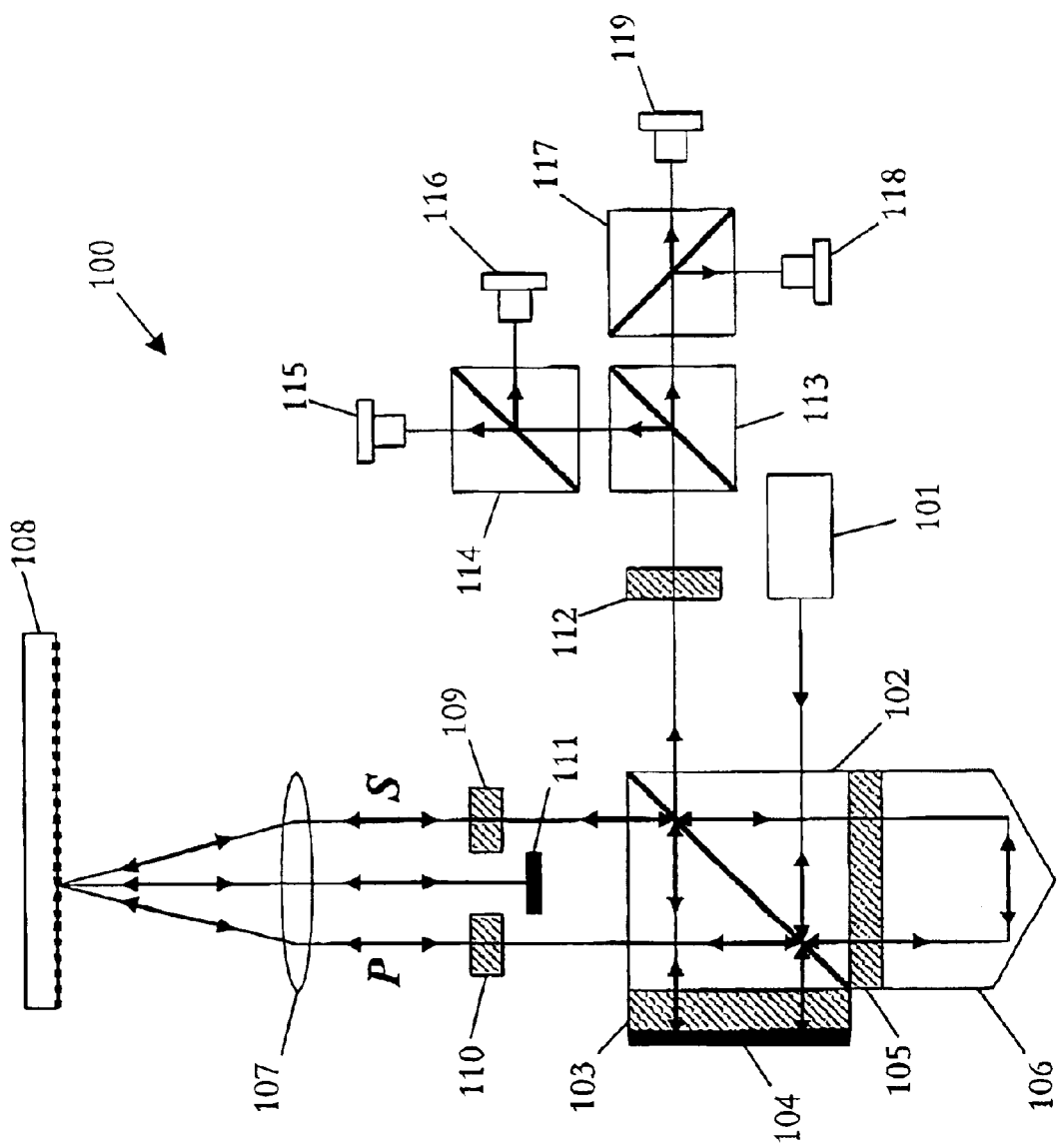
FIG. 1 schematically illustrates the configuration of a diffraction laser encoder apparatus in accordance with a preferred embodiment of the present invention.

In accordance with the teaching of the present invention, a preferred embodiment of the diffraction encoder system of the present invention analyzes into phase information in the diffraction signal collected from the target grating. FIG. 1 schematically outlines the configuration of a diffraction laser encoder apparatus in accordance with a preferred embodiment of the present invention. The diffraction laser encoder 100 of FIG. 1 can be utilized as a laser scaling instrument using a diffraction grating 108. In the example depicted in FIG. 1, the diffraction grating 108 is a linear grating. However, as is comprehensible for those skilled in the art, other forms of diffraction grating arrangements other than the liner grating depicted herein are also applicable.

The encoder apparatus 100 of FIG. 1 has a laser light source 101, which may, for example, be an LED laser light source. Laser beam produced by source 101 is directed toward a polarization beam splitter 102. Polarization beam splitter 102 has a polarization and beam-splitting characteristics allowing the P-polarization component of the source beam generated by the laser light source 102 to pass directly therethrough. P-polarization light leaving the polarization beam splitter 102 then passes through a quarter-wave plate 103 and reaches to a planar reflector 104 placed behind the quarter-wave plate 103.

At the reflector 104, the P-polarization component of the source beam is reflected back into the polarization beam splitter 102. The polarization and beam-splitter characteristics of the polarization beam splitter 102 then allows the P-component returned by the reflector 104 to be reflected 90 degrees and exists the splitter 102. The reflected P-polarization component departs toward the direction where the target grating is located as is illustrated in the drawing.

The S-polarization component of the source light, on the other hand, is reflected 90 degrees by the polarization beam splitter 102 into a corner cube reflector 106 via passage through a quarter-wave plate 105. Note that the direction of reflection by the splitter 102 for the S-polarization component is the opposite to that of the P-polarization component leaving the splitter 102.

Inside the corner cube reflector 106, the S-polarization component of the source beam is reflected 90 degrees twice before exiting. The corner cube reflector effects a positional shift among the incoming and the exiting S-polarization component beams with respect to each other. Essentially, the incoming and exiting S-polarization beams are offset to each other while maintaining a parallel relationship.

The S-polarization component of the source beam passes through the quarter-wave plate 105 again after it leaves the corner cube reflector 106. After leaving the quarter-wave plate 105, the S-polarization component of the source beam reenters the polarization beam splitter 102 again. Optical characteristics of the polarization beam splitter 102 allows this reentering S-polarization component to pass directly therethrough, and onward to a quarter-wave plate 109, also along the direction where the target grating 108 is located.

In the above-described beam paths, the combination of a quarter-wave plate and a reflector establishes a mechanism that can be used to rotate a π/2 (90 degrees) angle in the polarization orientation of the light beam. This allows for the control of either the passage through or reflection of a light beam directed toward the polarization beam splitter. Meanwhile, corner cube reflector 106 has a coating for achieving the desired polarization-state in order to align the beam in the desired orientation.

The two parallel P- and S-polarization components beams emerging from the polarization beam splitter 102 passes through the quarter-wave plate 110 and 109 respectively. Both beams are focused by a convex lens 107 onto the diffraction grating 108, generating the first diffraction lights of the positive and negative $1^{st}$-order.

Lens profile of the convex lens 107 is selected so that the direction of the first diffraction lights of the positive and negative $1^{st}$-order is normal to the grating plane. The first diffraction lights of the positive and negative $1^{st}$-order subsequently pass through the convex lens 107, reach to the reflector mirror 111, and are then reflected back to the diffraction grating 108, generating the second diffraction lights of the positive and negative $1^{st}$-order.

Reflector 111 is located at the back focal point of the convex lens 107 in order to form an optical mechanism that is effectively equivalent to a corner-cube reflector. Along the original beam path back to the polarization beam splitter 102, second diffraction lights of the positive and negative $1^{st}$-order are then combined together.

Utilizing the quarter-wave plate 112 in the back end, these two linear polarization lights are then transformed into a clock-wise and a counter-clockwise circular polarization light respectively. Then, a non-polarization beam splitter 113 splits these two circular polarization lights into two light beams with substantially the same light intensity. Each of the polarization beam splitters 114 and 117 then polarizes and splits its corresponding light beam.

Polarization beam splitter 117 is arranged 45-degrees offset relative to polarization beam splitter 114. Due to such an arrangement, signal outputs from these two polarization beam splitters have a 90-degree phase difference. This is the fundamental source of the PQ orthogonal signals. Light detector pair 115 and 116 and pair 118 and 119 are assigned to polarization beam splitters 114 and 117 respectively for transforming intensity of their received light signals into the corresponding voltage signals.

Electronic circuit of the respective detectors subsequently processes the voltage signal that is derived from the corresponding one of the light detectors 15 and 16 the to eliminate the constant component from the collected signal in order to obtain a pure Q orthogonal signal. Likewise, circuits also process to remove the constant component from the voltage signal that is derived from the light detectors 18 and 19 to obtain a pure P orthogonal signal. Further signal processing involving the comparison and fine-resolution electronic analysis of the electronic signals obtain the displacement vector and the velocity vector of the target object that has the diffraction grating attached thereto.

Figure 2:
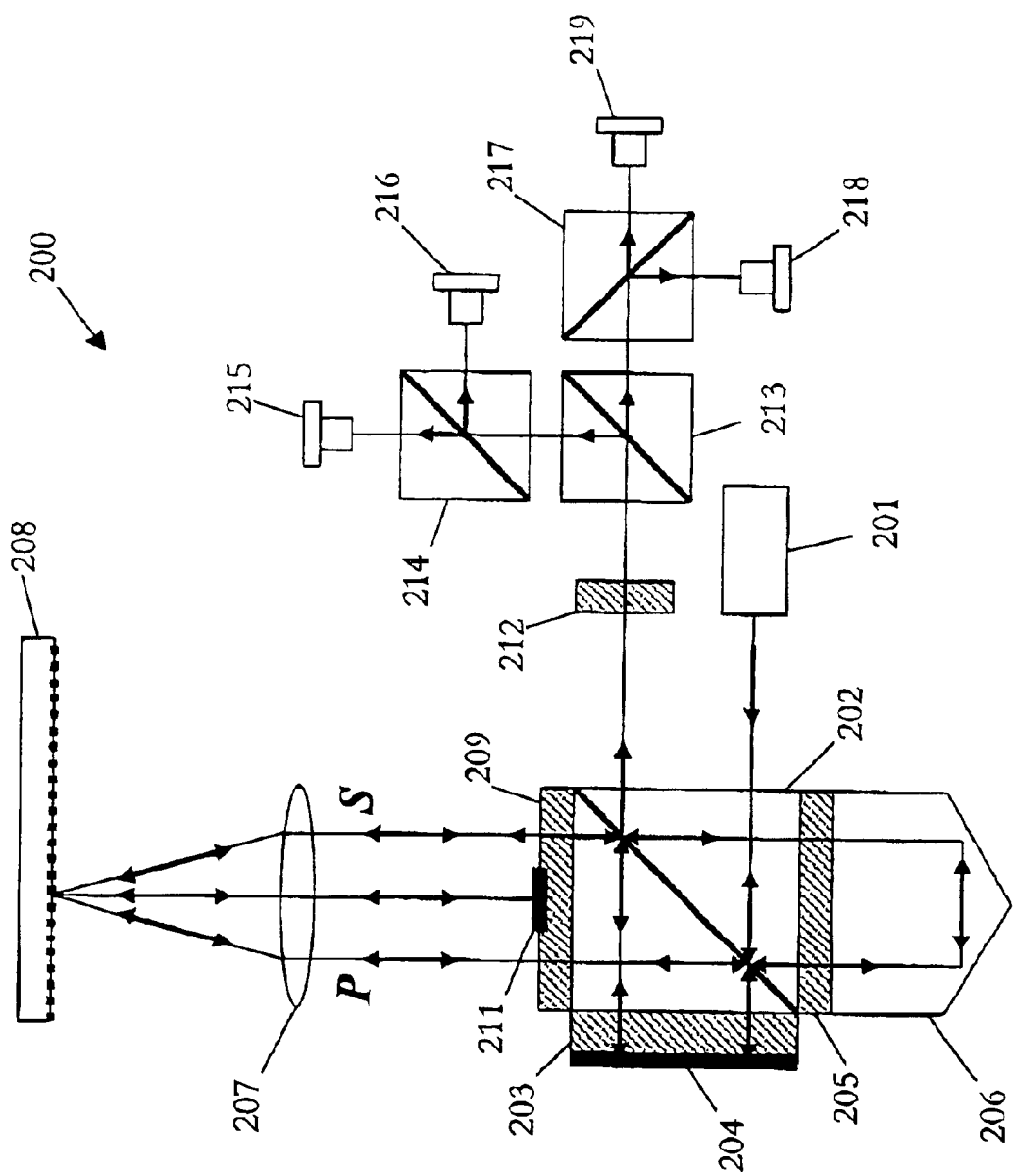
FIG. 2 schematically illustrates the configuration of a diffraction laser encoder apparatus in accordance with another preferred embodiment of the present invention.

FIG. 2 schematically illustrates the configuration of a diffraction laser encoder apparatus in accordance with another preferred embodiment of the present invention. The system 200 of FIG. 2 is different in that quarter-wave plates 109 and 110 of the setup 100 in FIG. 1 are replaced by a single plate 209. Also, the reflector 111 is replaced by a reflective coating 211 on the quarter-wave plate 209.

Location of the reflective coating making up the reflective mirror 211 is at the back focal point of the convex lens 207 in order to provide the functionality of a corner cube reflector. This configuration 200 further reduces the complexity in terms of optical elements and also simplifies the calibration requirement. Further, background noise induced by the two reflected beams and the second diffraction beams into the light detector at the backside can be avoided. The two reflected beams are direct reflections generated by the diffraction grating. As a result, signal-to-noise ratio is improved significantly.

Optical behavior of the assembly combination of the convex lens 107 and the reflector 111 is equivalent to a corner cube reflector. Wavefront as well as the position of the incident and the reflected lights are symmetrical with respect to the mirror center of the corner cube reflector. Such symmetry provides for evened and reduced image difference resulting from the relative tilting between the plane of the grating and the plane of the light head of the setup.

In the optical setup of FIG. 1, as mentioned above, the diffraction grating 108 can be of either linear, radial or cylindrical arrangement. This allows for a wide variety of applications. False signal caused by image difference of the wavefront can be avoided significantly by having the light beam properly focused. Further, since the setup of FIG. 1 employs a beam path system making repeated utilization of the same optical elements, size of the light head is smaller compared to conventional optical encoders. Calibration of the setup is also easier.

While the above is a full description of the specific embodiments, various modifications, alternative constructions and equivalents maybe used without departing from the spirit and scope of the invention. Therefore, the above description and illustrations should not be taken as limiting the scope of the present invention which is defined by the appended claims.

What is claimed is:

1. A diffraction laser encoder apparatus for positional and movement information measurement of a target having a diffraction grating made thereon, said apparatus comprising:

a laser light source for generating a source beam;

a polarization beam splitter assembly comprising a polarization beam splitter for receiving said source beam for splitting a P-polarization component and an S-polarization component of said source beam into parallel and offset beams;

a focusing lens assembly comprising a focusing lens for focusing said P-polarization component and said S-polarization component beams onto said target diffraction grating and returning diffracted P-polarization and diffracted S-polarization beams back into said polarization beam splitter for generating a detector beam coaxially containing said diffracted P-polarization and said diffracted S-polarization beams; and a detector assembly for receiving said detector beam for electrical processing and analysis for resolving into said positional and movement information.

2. The diffraction laser encoder apparatus of claim 1, wherein said polarization beam splitter assembly further comprises:

a P-polarization reflector means, comprising a P-polarization quarter-wave plate and a planar reflector; said P-polarization component of said source beam leaving said polarization beam splitter, passing through said P-polarization quarter-wave plate, reflected by said planar reflector and passing through said P-polarization quarter-wave plate again and reentering said polarization beam splitter.

3. The diffraction laser encoder apparatus of claim 1, wherein said polarization beam splitter assembly further comprises:
an S-polarization reflector means, comprising an S-polarization quarter-wave plate and a corner cube reflector, said S-polarization component of said source beam leaving said polarization beam splitter, passing through said S-polarization quarter-wave plate, reflected and offset by said corner cube reflector and passing through said S-polarization quarter-wave plate again and reentering said polarization beam splitter.

4. The diffraction laser encoder apparatus of claim 1, wherein said focusing lens assembly further comprising a reflector mirror positioned at the back focal point of said focusing lens.

* * * * *